United States Patent
Baehr (10) Patent No.: US 10,935,082 B2
(45) Date of Patent: Mar. 2, 2021

(54) SYNCHRONIZER DEVICE FOR A MANUAL TRANSMISSION

(71) Applicant: GETRAG FORD TRANSMISSIONS GMBH, Cologne (DE)

(72) Inventor: Julian Baehr, Meerbusch (DE)

(73) Assignee: GETRAG FORD TRANSMISSIONS GMBH, Cologne (DE)

(*) Notice: Subject to any disclaimer, the term of this patent is extended or adjusted under 35 U.S.C. 154(b) by 13 days.

(21) Appl. No.: 16/311,840

(22) PCT Filed: Jun. 19, 2017

(86) PCT No.: PCT/EP2017/064938
§ 371 (c)(1),
(2) Date: Dec. 20, 2018

(87) PCT Pub. No.: WO2017/220493
PCT Pub. Date: Dec. 28, 2017

(65) Prior Publication Data
US 2019/0203779 A1  Jul. 4, 2019

(30) Foreign Application Priority Data
Jun. 20, 2016  (DE) .................... 10 2016 111 274.7

(51) Int. Cl.
*F16D 23/06* (2006.01)
*F16D 11/14* (2006.01)
(Continued)

(52) U.S. Cl.
CPC .............. *F16D 23/06* (2013.01); *F16D 11/14* (2013.01); *F16D 23/025* (2013.01); *F16H 63/30* (2013.01);
(Continued)

(58) Field of Classification Search
CPC .................................... F16D 23/06–2023/0631
See application file for complete search history.

(56) References Cited

U.S. PATENT DOCUMENTS 3,286,801 A * 11/1966 Wojcikowski ...... F16D 23/0606
192/53.331
5,135,087 A * 8/1992 Frost ....................... F16D 23/06
192/53.31

(Continued)

FOREIGN PATENT DOCUMENTS

CN    203730603 U    7/2014
CN    203822894 U    9/2014
(Continued)

*Primary Examiner* — Ernesto A Suarez
*Assistant Examiner* — Lillian T Nguyen
(74) *Attorney, Agent, or Firm* — Pauley Erickson & Swanson (57) ABSTRACT

A synchronizer device for a manual transmission, having a shaft and a selector gear that is mounted on the shaft. The synchronizer device includes a hub, which can be connected to the shaft in a rotationally locked fashion, a slider sleeve, which is supported on the hub in a rotationally locked fashion, and can be slid in the axial direction, a locking element that is designed to limit the slidability of the slider sleeve in a locked position, a friction package, which has an outer synchro ring, an inner synchro ring, and an intermediate ring.

22 Claims, 9 Drawing Sheets

(51) Int. Cl.
*F16D 23/02* (2006.01)
*F16H 63/30* (2006.01)
*F16D 11/00* (2006.01)

(52) U.S. Cl.
CPC .................. *F16D 2011/002* (2013.01); *F16D 2023/0618* (2013.01); *F16H 2063/3093* (2013.01)

(56) References Cited

U.S. PATENT DOCUMENTS

| | | | | |
|---|---|---|---|---|
| 5,638,930 | A * | 6/1997 | Parsons | F16D 23/06 192/53.32 |
| 6,390,266 | B1 * | 5/2002 | Rose | F16D 23/0606 192/53.331 |
| 2010/0263979 | A1 * | 10/2010 | Pamminger | F16D 23/06 192/53.341 |
| 2012/0292152 | A1 * | 11/2012 | Park | F16D 23/06 192/53.3 |
| 2019/0203779 | A1 | 7/2019 | Baehr | |

FOREIGN PATENT DOCUMENTS

| | | |
|---|---|---|
| DE | 10 2011 103 780 A1 | 12/2012 |
| EP | 1 757 830 A2 | 2/2007 |
| EP | 2 235 391 A2 | 10/2010 |
| EP | 2 472 134 A2 | 7/2012 |
| WO | WO 2009/076691 A2 | 6/2009 |

\* cited by examiner

SYNCHRONIZER DEVICE FOR A MANUAL TRANSMISSION

BACKGROUND OF THE INVENTION

Field of the Invention

This invention relates to a synchronizer device for a manual transmission having a shaft and a selector gear mounted on the shaft.

Discussion of Related Art

The synchronizer device in a manual transmission, for example, in a motor vehicle, ensures that the speed of the shaft is synchronized with the speed of the selector gear supported on it before this gear is connected to the shaft in a form-fitting manner, thus shifting into a new gear in the manual transmission. Normally, the synchronizer device includes a hub that can be connected to the shaft in a rotationally locked fashion and an axially slidable slider sleeve, which is supported on the hub in a rotationally locked fashion by a separate gearing. A locking element here, often embodied in the form of a locking ring with locking teeth, limits the slidability of the slider sleeve in a locked position. As long as the prerequisite for the locking of the locking element is met, the slider sleeve cannot be moved beyond a particular point in the axial direction. When shifting into gear, this ensures that the production of the form-fitting connection only takes place when there is no longer a speed difference between the slider sleeve and the gear wheel.

It is also known that the synchronizer device includes a friction package, which has an outer synchro ring, an inner synchro ring, and an intermediate ring, which is positioned between the outer synchro ring and the inner synchro ring. The outer synchro ring and the inner synchro ring in this case are associated with the shaft and the hub, respectively. The speed of the outer synchro ring and the speed of the inner synchro ring correspond to the respective speeds of the shaft and hub, while the intermediate ring is associated with the selector gear and is rotationally locked to it. The provision of the outer synchro ring, the inner synchro ring, and the intermediate ring produces a plurality of friction pairings within the friction package.

With an axial pressure on the friction package, a frictional torque is produced between the shaft and the gear. This frictional torque ensures the necessary speed compensation between the shaft and the selector gear. In this case, the more powerful the shifting force that the axial pressure produces, the greater the frictional torque between the individual rings of the friction package. A high frictional torque reduces the time needed for the synchronization of the shaft and the selector gear, thus reducing shifting times overall.

In the synchronization process, a distinction can be drawn between the so-called pre-synchronization and the main synchronization. During the pre-synchronization, the locking element is brought into the locked position. In this locked position, the flanks of a splash coating of the internal gearing of the slider sleeve rest against corresponding flanks of the locking teeth of the locking ring. In order for the slider sleeve to be moved beyond the locking ring, the locking ring must be pushed away from the slider sleeve in the circumference direction. This requires a certain unlocking torque that depends on the axial force acting on the locking teeth and the angle that the flanks of the splash coating assume relative to the axial direction. As long as the unlocking torque is less than the frictional torque of the friction package, the locking ring cannot be pushed to the side. Only if the torque in the friction package is eliminated as a result of the speed compensation that has been performed, can the locking ring be rotated to the side. The main synchronization follows the free-flight phase until the slider sleeve comes into contact with a coupling ring, which is rotationally locked relative to the selector gear. In order to minimize the shifting forces when docking the slider sleeve into the gearing of the coupling ring, it is advantageous to provide sharp tips on the internal gearing of the slider sleeve. But the tips of the internal gearing cannot be reduced to an arbitrary degree since otherwise, the locking ring would lose its safeguarding locking effect. In other words, the shifting force cannot be made arbitrarily low by making the tips sharper.

The shifting force exerted by the driver of the motor vehicle is limited or should, for comfort reasons, be as low as possible. Quickly synchronizing components with high inertias, however, requires high frictional torques and thus high shifting forces. For example, European Patent Reference EP 2 235 391 B1 discloses a power boost or servo unit for a synchronizer device, which is equipped with a hub, a slider sleeve, a locking ring, an outer synchro ring, an intermediate ring, and an inner synchro ring. The servo unit has a first servo surface on a first component and with a second servo surface on a second component that rests against the first servo surface. The first component here is the hub into which the first servo surface is molded in the form of a bevel. The second component is embodied in the form of a pressure element, which likewise has a bevel for the second servo surface. If an axial force is introduced into the pressure element during the shifting, then a torque acts between the hub and the pressure element so that because of the bevels resting against each other, the torque produces an additional axial force on the pressure element. As a result, the actual axial force is boosted; this boosting is also referred to as servo force.

In European Patent Reference EP 2 235 391 B1, the outer synchro ring and the inner synchro ring are not connected to each other in a rotationally locked fashion. The outer synchro ring is embodied of one piece with the locking ring so that they form a unit. The pressure element is connected to the inner synchro ring in a rotationally locked fashion. Although the shifting force can be kept low by the servo unit and the increase in the number of friction pairings in the friction package, there is still a need for an additional synchronizer device, which allows for a convenient operation of a manual transmission that is equipped with the synchronizer device.

SUMMARY OF THE INVENTION

One object of this the invention is to provide a synchronizer device for a manual transmission which permits a simple operation of the manual transmission.

This object and others of this invention are attained with the synchronizer device having embodiments discussed in this specification and in the claims.

According to this invention, the servo force on the friction package is introduced by the outer synchro ring, which is able to rotate relative to the locking element over a small angular range. In one exemplary embodiment, the locking element is embodied as a locking ring with locking teeth, which, in the locked position of the locking ring, engage with the teeth of the internal gearing of the slider sleeve.

The small angular range of rotatability can be less than 10° or 5° (360° corresponds to a full rotation), depending on the rotatability of the outer synchro ring relative to the locking element in the assembled state of the synchronizer device. The rotatability in this context can also be determined by components that cooperate with the locking ring and/or the outer synchro ring. The outer synchro ring in this case constitutes a component with a friction surface, which normally contributes to the frictional torque of the friction package during the synchronization.

The rotatability according to this invention differs from a rotationally locked connection, which, merely due to production tolerances or for reasons of ease of assembly, is encumbered with a certain amount of play, but this play does not have any other functional reason to exist. The rotatability aspect of this invention results in a separation of the functions "produce servo power" and "produce locked position," which will be discussed in greater detail further below.

In one exemplary embodiment, the inner synchro ring is connected to the locking ring in a rotationally locked fashion so that during the pre-synchronization, the frictional torque acting on the inner synchro ring rotates the locking ring into the locked position. Thus in this case, the inner synchro ring performs the function "produce locked position." For the rotationally locked connection to the inner synchro ring, the locking ring can have at least one drive tab oriented radially inward, which engages in a groove of the inner synchro ring. Preferably, a plurality of drive tabs that are spaced apart from one another in the circumference direction are provided, for example, six drive tabs with a spacing of 60° between adjacent drive tabs.

The inner synchro ring can have a friction surface oriented radially inward in order to cooperate with a conical surface of the selector gear. In addition to a friction pairing between the intermediate ring that is connected to the selector gear in a rotationally locked fashion, the inner synchro ring thus permits there to be an additional friction pairing, namely formed by the friction surface oriented radially inward and the conical surface of the selector gear. The frictional torque acting on the inner synchro ring, which rotates the locking ring into the locked position, is therefore composed of the frictional torques of the two friction pairings. An additional friction pairing is provided between the outer synchro ring and the intermediate ring.

If, after the pre-synchronization and main synchronization have been completed, the locking ring is to be rotated out of the locked position, this is counteracted by the frictional torques of the two friction pairings of the inner synchro ring. This means that the unlocking torque can be set to be correspondingly high, which can be achieved through the design of the tips of the internal gearing of the slider sleeve. It is thus possible to choose comparatively sharp tips, which can minimize the shifting forces when docking the slider sleeve into the gearing of the coupling ring. By contrast, in the prior art according to European Patent Reference EP 2 235 391 B1, in which the outer synchro ring is embodied as rotationally locked relative to the locking ring, thus counteracting the unlocking torque, the frictional torque is based on only one friction pairing, such as between the outer synchro ring and the intermediate ring. Correspondingly, the tips of the internal gearing of the slider sleeve in that case cannot be embodied in as sharp a fashion, so as not to jeopardize a secure locking by the locking rings in the locked position. In European Patent Reference EP 2 235 391 B1, if the locking ring exits the locked position, then a rotation of the outer synchro ring occurs relative to the slider sleeve and relative to the intermediate ring, which is rotationally locked relative to the selector gear. In this invention, the movement of the locking element out of the locked position can be decoupled from a simultaneous or preceding movement of the outer synchro ring relative to the slider sleeve. For the movement of the locking element out of the locked position, a prior relative movement of the outer synchro ring relative to the slider sleeve is not needed. Instead, the position of the outer synchro ring relative to the slider sleeve and intermediate ring can remain unchanged in the movement of the locking element out of the locked position.

The synchronizer device can be designed so that the movement of the locking element out of the locked position is connected with a rotation of the inner synchro ring relative to the slider sleeve. The movement of the locking element out of the locked position can take place in any direction, for example, in the circumference direction or in the radial direction.

The synchronizer device can have a pressure element, which is positioned in a groove of the hub and transmits an axial force of the slider sleeve to the friction package. The pressure element in this case can have a cavity in which a cam of the outer synchro ring engages so that the pressure element and the outer synchro ring are connected to each other in a rotationally locked fashion. A plurality of pressure elements distributed over the circumference of the hub can be provided. Correspondingly, the outer synchro ring can also have a plurality of cams.

In one embodiment of this invention with a bottom of the cavity, the pressure element presses in the axial direction against the cam of the outer synchro ring. It is thus possible to introduce an axial force into the friction package by the pressure element.

The hub can include the first servo surface while the second servo surface can be associated with the pressure element. If the pressure element introduces an axial force into the friction package by the outer synchro ring, then the outer synchro ring is acted on by a torque that rotates it slightly relative to the hub in the circumference direction. Because of the rotationally locked connection between the outer synchro ring and the pressure element, the pressure element is also rotated slightly relative to the hub. This rotation of the pressure element relative to the hub causes the second servo surface of the pressure element to slide along against the first servo surface of the hub. This results in an axial relative movement between the hub and the pressure element, thus boosting the axial force acting on the pressure element. This boosting action or servo force is thus attributable to the interaction of the pressure element and the outer synchro ring. In this exemplary embodiment, the pressure element and the outer synchro ring therefore perform the function "produce servo power."

The second servo surface can alternatively also be formed onto the outer synchro ring so that the outer synchro ring rests with the second servo surface against the first servo surface of the hub. The pressure element in this case can be embodied in a conventional fashion, for example, without servo surfaces.

The first servo surface does not necessarily have to be formed onto the hub. For example, it is possible to embody the first servo surface on the locking ring.

The hub can have two stop surfaces for the pressure element, which extend essentially perpendicular to the circumference direction and limit a rotatability of the pressure element relative to the hub. It is thus also possible to limit the axial distance that the pressure element can travel axially due to the cooperation of the servo surfaces.

The pressure element can have a pressure component such as a spring-loaded ball. The pressure component can be pushed radially outward against the slider sleeve. In the slider sleeve, a pre-synchronization groove can be provided, in which the pressure component can move in the circumference direction relative to the hub. Such a relative movement in the circumference direction relative to the hub or shaft occurs if the pressure element is equipped with the second servo surface and moves in the circumference direction relative to the hub with the relative sliding of the first servo surfaces.

In one exemplary embodiment, transverse to the pre-synchronization groove, a pressure component track is provided into which the pressure component is inserted after the locking element has exited the locked position. In this case, the presence of the pressure component track results in the fact that the pressure element can no longer be deflected in the circumference direction relative to the slider sleeve or hub. This avoids the production of an unintended servo effect by the pressure element. The pressure component track in this case preferably starts in the middle of the pre-synchronization groove.

A maximum deflection from a middle position of the pressure component along the pre-synchronization groove can approximately correspond to the distance that the locking ring travels in the circumference direction when it exits the locked position and thus permits the slider sleeve to slide through in the axial direction. Such a design causes the pressure component to be moved back approximately into the middle position in the middle of the pre-synchronization groove when the unlocking occurs, which facilitates an insertion into the pressure component track.

The locking ring can have an axial contact surface for the outer synchro ring. It is thus possible, through axial pressure on the locking ring, to introduce axial pressure into the friction package by the outer synchro ring.

BRIEF DESCRIPTION OF THE DRAWINGS

This invention is explained in greater detail in view of exemplary embodiments shown in the figures, wherein.

DETAILED DESCRIPTION OF INVENTION

Figure 1:
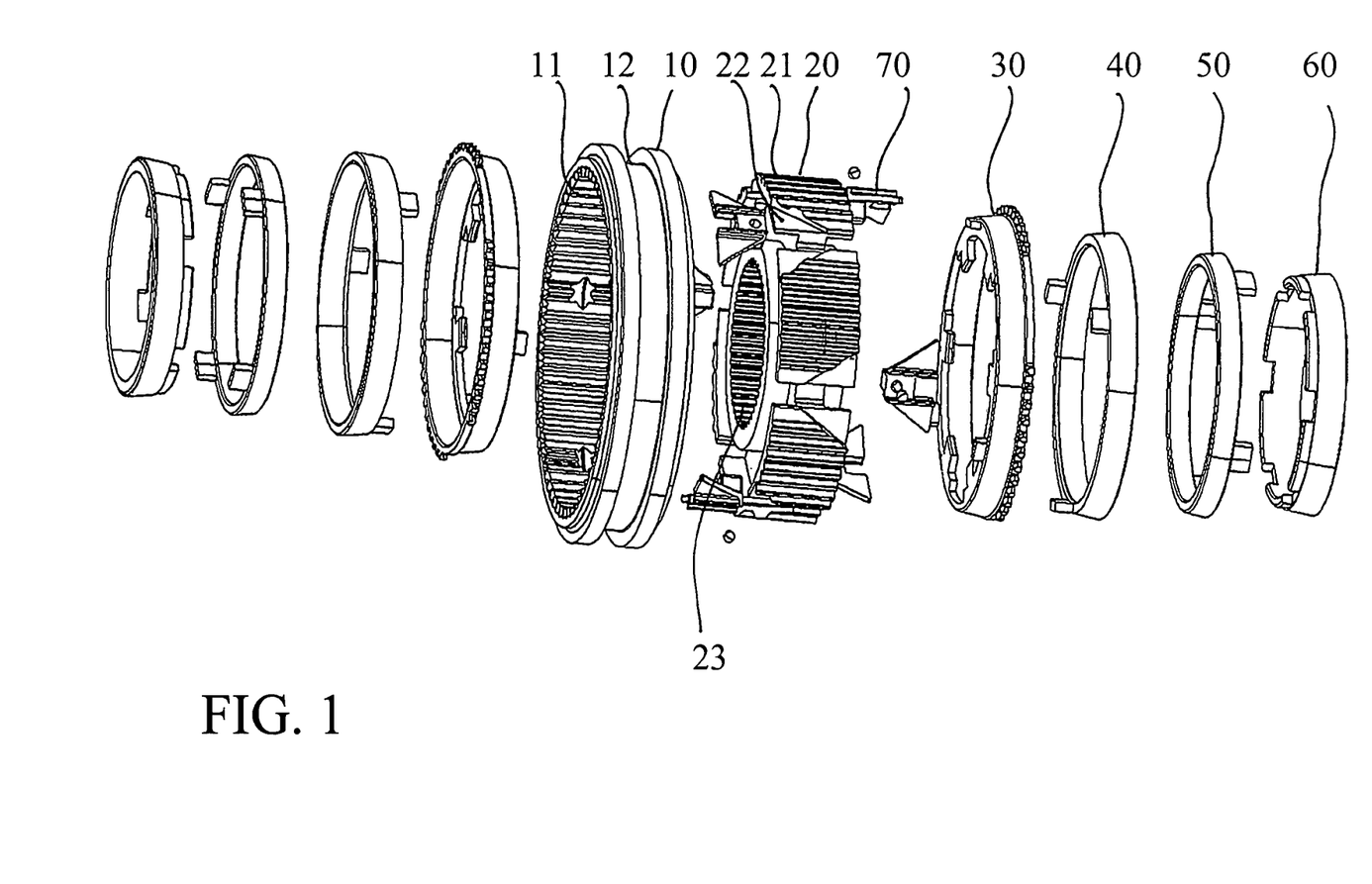
FIG. 1 shows an exploded view of an exemplary embodiment for a synchronizer device according to this invention.

FIG. 1 shows an exploded view of an exemplary embodiment of a synchronizer device according to this invention, which is labeled in its entirety with the reference numeral 1. The synchronizer device 1 includes a slider sleeve 10, which rests against a hub 20 in the usage position. In this case, an internal gearing 11 of the slider sleeve 10 engages with an external gearing 21 of the hub 20 so that the slider sleeve 10 and the hub 20 are connected to each other in a rotationally locked fashion. The slider sleeve 10 is nevertheless able to slide back and forth in the axial direction on the hub 20.

The synchronizer device 1 also includes a locking ring 30, which is able to rotate relative to the hub 20 and slider sleeve 10 over a small angular range in the circumference direction. A friction package of the synchronizer device 1 includes an outer synchro ring 40, an intermediate ring 50, and an inner synchro ring 60.

The synchronizer device 1 also includes another locking ring and another friction package so that the synchronizer device 1 shown here can be part of a double gear-shifting clutch in a manual transmission. Since the design of the additional locking ring corresponds to that of the locking ring 30 and the design of the additional friction package corresponds to that of the friction package with the rings 30 through 60, the description below will refer only to the locking ring 30 and the friction package with the outer synchro ring 40, the intermediate ring 50, and the inner synchro ring 60. With the presence of the double gear-shifting clutch, it is possible to shift into two gears of the manual transmission. For this purpose, the slider sleeve can be axially slid in the one shifting direction or the other.

On an outer circumference surface, the slider sleeve 10 has a circumferential U-shaped groove 12 for accommodating a shift fork. Through the cooperation of the groove 12 and the shift fork that engages in it, a shifting force acting axially on the shift fork is transmitted to the slider sleeve 10.

The synchronizer device 1 includes a plurality of pressure elements 70, with each pressure element 70 resting in a groove 22 that is formed into the external gearing 21 of the hub 20. An internal gearing 23 of the hub 20 serves to produce a rotationally locked connection of the hub 20 to a shaft of the manual transmission on which the hub 20 is supported. The pressure elements 70 are separate components, which are in particular embodied as separate from the locking ring 30 (or generally separate from a locking element). The pressure elements 70 in this case do not perform the function of the locking element or more precisely, of the locking ring 30.

Figure 12:
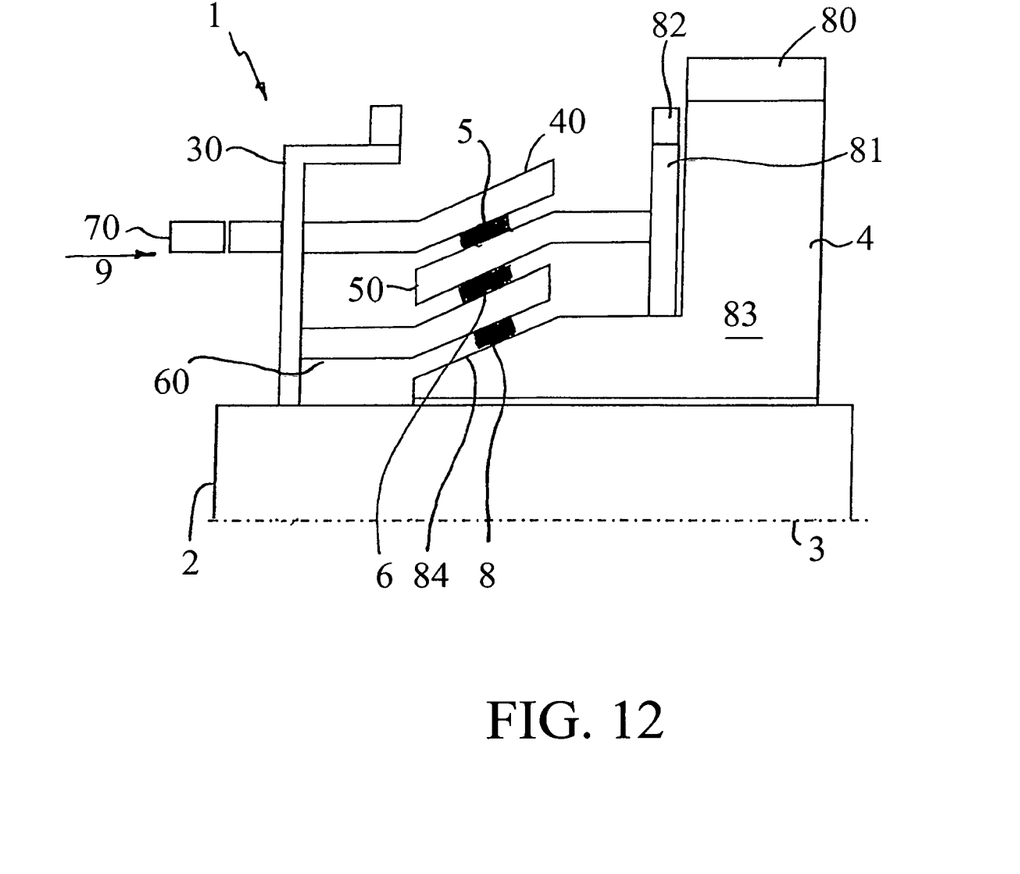
FIG. 12 schematically shows the cooperation of the individual components of the synchronizer device.

FIG. 12 schematically shows the individual components of the synchronizer device 1 and their cooperation. The shaft mentioned above is labeled with the reference numeral 2 in FIG. 12 and is supported so that it is able to rotate around a rotation axis 3 in the manual transmission that is not shown here. FIG. 12 shows the locking ring 30 as well as the outer synchro ring 40, the intermediate ring 50, and the inner synchro ring 60. The slider sleeve 10 and the hub 20 are not shown in FIG. 12. The pressure element 70 is schematically shown in the form of a rectangle in FIG. 12. FIG. 12 also shows a selector gear 4 that is rotatably supported on the shaft 2. The selector gear or idler 4 has an external gearing 80 by which the selector gear 4 meshes with another gear (not shown) of the manual transmission. The selector gear 4 also has a coupling ring 81 with an external gearing 82. The coupling ring 81 in this case is mounted to a base body 83 of the selector gear 4 in a rotationally locked fashion. The intermediate ring 50 is likewise mounted to the base body 83 in a rotationally locked fashion.

There is a rotationally locked connection between the locking ring 30 and the inner synchro ring 60. Between the outer synchro ring 40 and the locking ring 30, however, there is an ability to rotate within a particular angular range. In other words, the outer synchro ring can be rotated relative to the locking ring 30 by a certain degree. It should also be noted that the locking ring 30 is able to rotate relative to the shaft 2.

Figure 2:
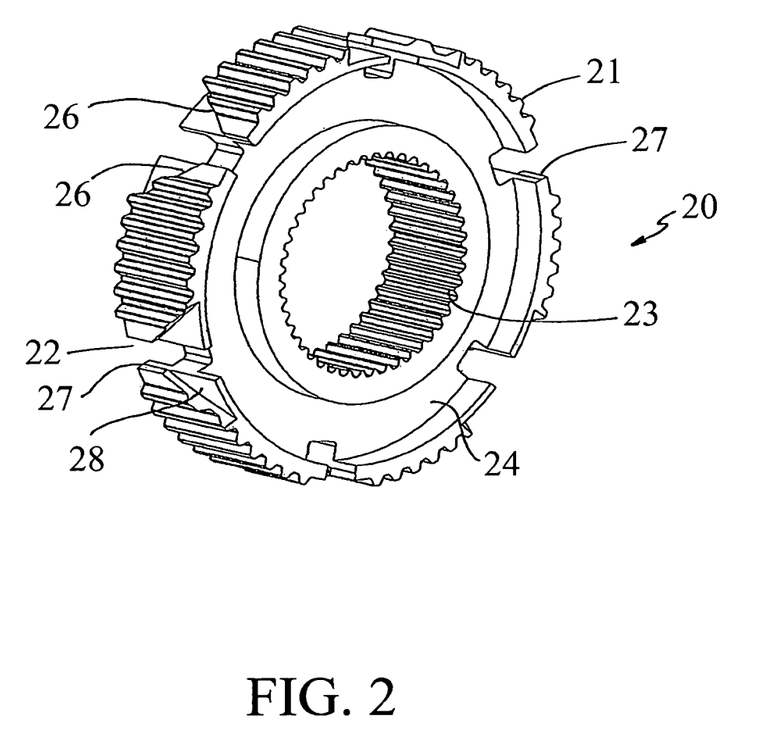
FIG. 2 shows a hub of the synchronizer device as shown in FIG. 1.

FIG. 2 shows the hub 20 with the external gearing 21 for the rotationally locked connection to the slider sleeve 10 and with the internal gearing 23 for the rotationally locked connection to the rotation axis 3. In FIG. 2, it is readily apparent that the groove 22 extends down to a connecting piece 24 between internal gearing 23 and external gearing 21. The groove 22 defines stop surfaces 25 for the pressure component 70 in the connecting piece 24, which extend perpendicular to the circumference direction. In the external gearing 21 of the hub 20 two bevels 26 are cut through the groove 22, which will be referred to below as first servo surfaces. The two bevels 26 of a groove 22 extend in a V shape and they do not extend over the entire width of the external gearing 21, but rather only over half the width. The groove 22 therefore provides additional stop surfaces 27, which are oriented perpendicular to the circumference direction. The stop surfaces 27 will also be referred to below as outer stop surfaces since they lie further to the outside in the radial direction relative to the stop surfaces 25. The groove 22 therefore also forms a support surface 28 for the pressure element 70. The support 28 defines the position of the pressure element 70 in the radial direction relative to the hub 20.

In all, six grooves 22 are provided in the hub 20. In FIG. 2, three grooves with the bevels 26 oriented in a V shape are oriented axially toward the right and the remaining three grooves are oriented axially toward the left.

FIGS. 3a and 3b clearly show how the pressure element 70 is arranged in the groove 22. While FIG. 3a shows a position of the pressure element 70 in the groove 22, which can be referred to as the middle position since, viewed in the circumference direction, the pressure element 70 is positioned in the middle of the groove 22, FIG. 3b shows the pressure element 70 in position in which it has been deflected toward the right in the depiction in FIG. 3b. It is clear that in the deflected position according to FIG. 3b, a spring retainer 71 rests against both of the stop surfaces 25. The pressure element 70 is thus deflected in the circumference direction to the right relative to the middle position of FIG. 3a.

Figure 3:
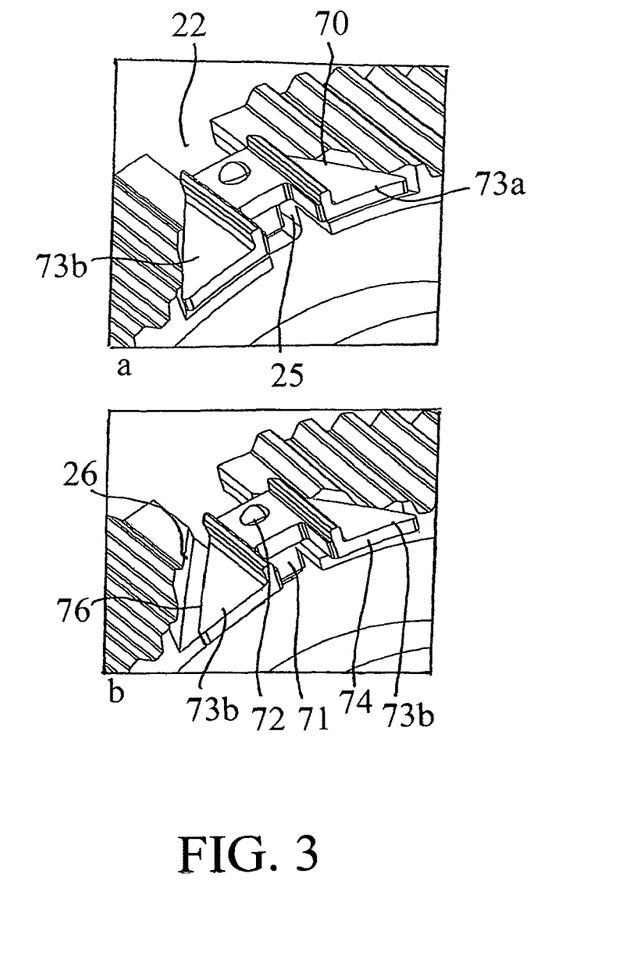
FIG. 3 shows two different positions of a pressure element relative to the hub.
Figure 4:
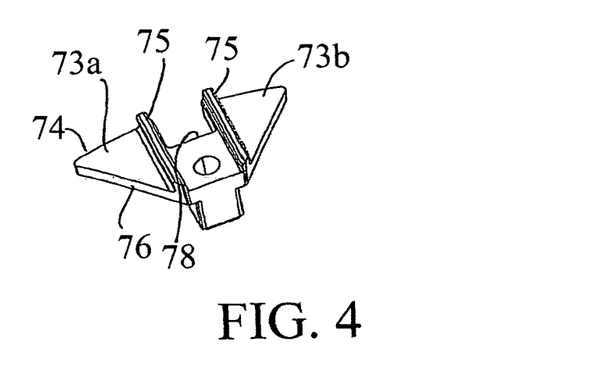
FIG. 4 shows the pressure element as shown in FIG. 3 without the pressure component.

The design of the pressure element 70 will be described based on FIGS. 3 and 4. The spring retainer 71 to accommodate a spring (not shown) and a ball 72, which, in the assembled state of the synchronizer device 1, the spring pushes radially outward against the slider sleeve 10. The pressure element 70 has two wings 73a, 73b, which are each have the basic form of a right triangle. The sides of the right triangle that are at aright angle to each other are labeled with the reference numerals 74 and 75. The side 75 is slightly raised here and an upper edge of the side 75 is used for radially affixing the pressure element 70 between the hub 20 and the slider sleeve 10. In the usage position, a long side of the right triangle rests against the first servo surface 26 of the groove 22. This long side is labeled with the reference numeral 76 and is also referred to below as the second servo surface. If, starting from the middle position of the pressure element 70 in the groove 22 shown in FIG. 3a, a force acts on the pressure element 70 in the circumference direction, then the pressure element 70 in the groove 22 is not only deflected in the circumference direction, but is also slid axially relative to the hub 20 since, through the cooperation of the first servo surface 26 and second servo surface 76, the movement of the pressure element 70 in the circumference direction is coupled to a movement in the axial direction. When FIGS. 3a and 3b are considered in combination, it becomes clear that in the position that is deflected toward the right in the circumference direction in FIG. 3b, the sides 74 of the pressure element 70 protrude slightly beyond an end surface of the external gearing 21. In addition, a gap is produced between the second servo surface 76 of the left wing 73b in FIG. 3b and the corresponding first servo surface 26 on the hub 20.

In the embodiment shown here, the angle of the second servo surface 76 relative to each of the two other sides 74, 75 is about 45°. This means that a deflection of the pressure element 70 by a unit of length in the circumference direction involves a movement by a unit of length in the axial direction.

A U-shaped recess 77 is provided between the parallel sides 75. The recess has a bottom 78 by which an axial force acting on the pressure element 70 can be transmitted to a component that engages in the recess. The sides 75 essentially form the side surfaces of the recess 77.

Figure 5:
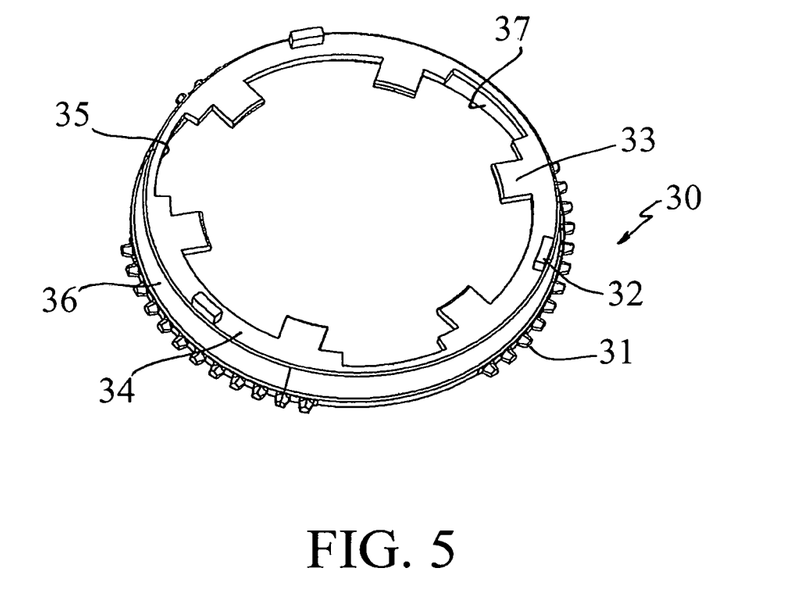
FIG. 5 shows a locking ring of the synchronizer device from FIG. 1.

As shown in FIG. 5, the locking ring 30 has locking teeth 31 protruding radially outward on its outer surface. Three indexing cams 32 extend in the axial direction, which are arranged spaced apart from one another by 120° around the circumference. In the assembled state of the synchronizer device 1, each indexing cam 32 engages in a groove 22 of the hub 20, with the indexing cam being positioned between the opposing upper stop surfaces 27. With reference to FIG. 1, the indexing cams 32 of the right-side locking ring 30 engage between the outer contact surfaces 27 of the grooves 22, whose bevels 26 are arranged in a V shape face toward the left in FIG. 1.

Through the cooperation of the indexing cams 32 and the outer or upper stop surfaces 27, two locked positions of the locking ring 30 relative to the hub 20 are established. If the cam 32 is resting against one of the outer stop surfaces 27, then this defines a first locked position. If it is resting against the opposite stop surface 27, then this defines a second locked position.

The locking ring 30 has six drive tabs 33 oriented radially inward. The drive tabs 33 are used for producing the rotationally locked connection with the inner synchro ring 60. In addition, on one end surface, a circumferential end-surface rim 34 is provided, which is interrupted by recesses 35. By the circumferential rim 34, an axial force that is introduced into the locking ring 30 by the locking teeth 31 can be transmitted to the outer synchro ring 40.

An outer conical circumference surface 36 and an inner conical circumference surface 37 extend between the circumferential rim 34 and the locking teeth 31. The inner conical circumference surface in 30, however, is not designed to form a friction pairing with the outer synchro ring 40. The inner conical circumference surface thus has no function in connection with the friction package.

Figure 6:
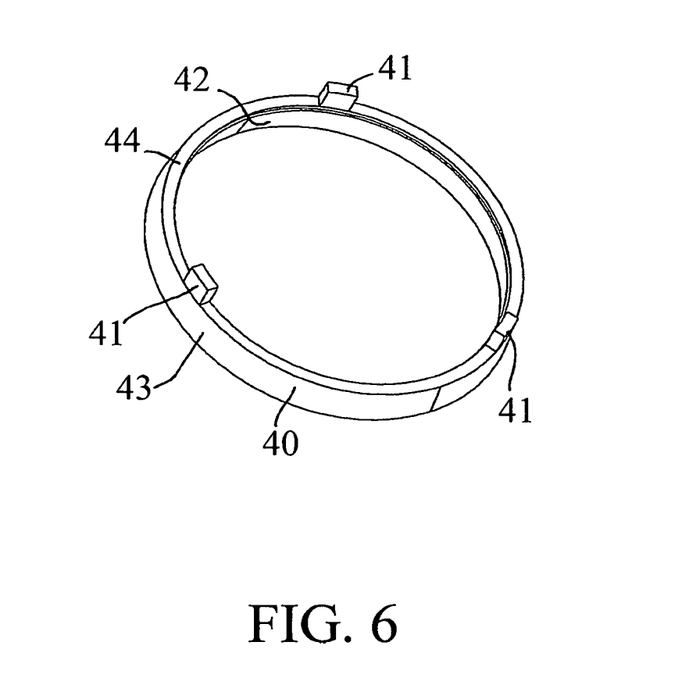
FIG. 6 shows an outer locking ring of the synchronizer device as shown in FIG. 1.

The outer synchro ring 40 (see FIG. 6) has three cams 41 oriented in the axial direction, which, in the installed position, engage in the U-shaped recess 77 of the pressure element 70. The cams 41 and recesses 77 of the pressure element 70 thus ensure a rotationally locked connection between the outer synchro ring 40 and the pressure elements 70. An inner conical circumference surface 42 is embodied as a friction surface, while an outer conical circumference surface 43 remains without function. An end surface 44 from which the cams 41 extend in the axial direction serves as an axial stop surface for the circumferential rim 34 of the locking ring 30. An axial force on the locking ring is transmitted by the rim 34 and the end surface that is then resting against it to the outer synchro ring, which is supported against the other rings of the friction package and/or against the selector gear 4.

The intermediate ring 50 (see FIG. 7) has four drive tabs 51, which serve to produce the rotationally locked connection to the selector gear 4. The drive tabs 51 in this case extend in the axial direction from an annular base body 52.

Figure 7:
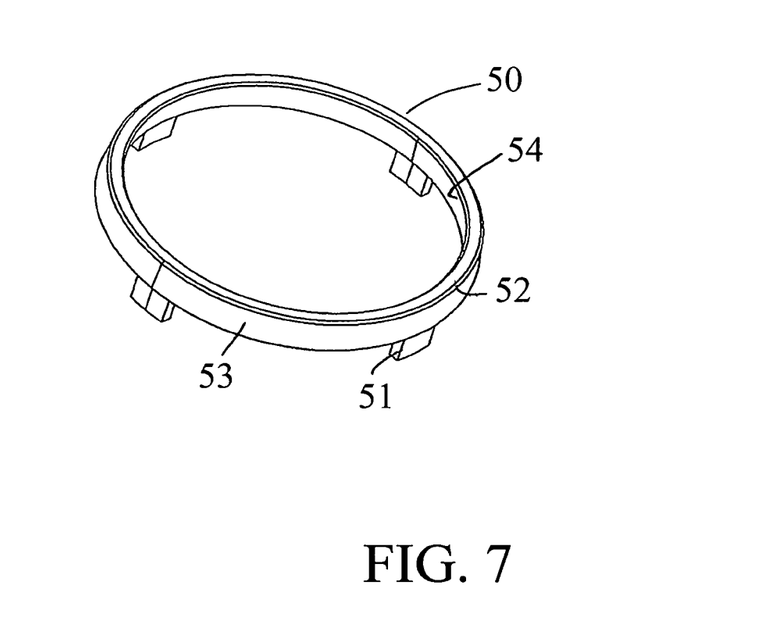
FIG. 7 shows an intermediate ring of the synchronizer device as shown in FIG. 1.

An outer conical circumference surface 53 serves to form a friction pairing with the inner conical circumference surface 42 of the outer synchro ring 40. This friction pairing, which can also be referred to as first friction pairings, is schematically shown by a solid black rectangle in FIG. 12 and is labeled with the reference numeral 5. An inner conical circumference surface 54 serves to produce a second friction pairing 6. The inner conical circumference surface 54 in this case rests against an outer conical circumference surface 61 of the inner synchro ring 60 (see FIG. 8). The second friction pairing is labeled with the reference numeral 6 in FIG. 12.

Figure 8:
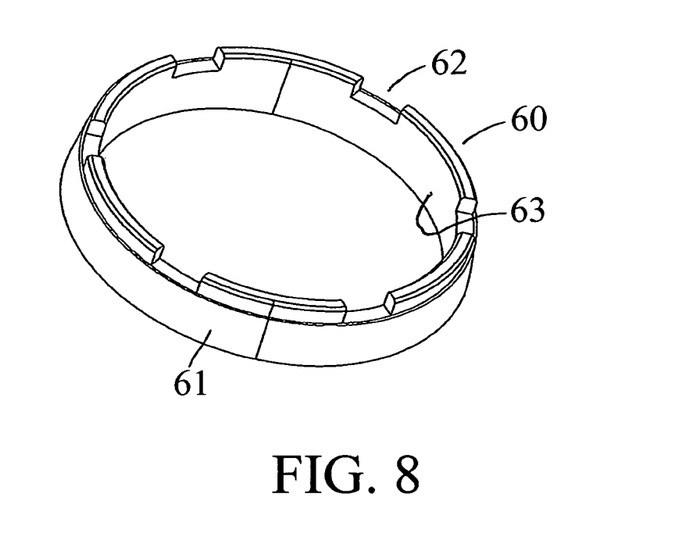
FIG. 8 shows an inner synchro ring as shown in FIG. 1.

The inner synchro ring 60, which has six equidistantly spaced recesses 62 on the circumference, is connected to the locking ring 30 in a rotationally locked fashion. The rotationally locked connection is produced by the cooperation of the drive tabs 33 of the locking ring 30 and the recesses 62. An inner conical circumference surface 63 is used to form a third friction pairing 8. For this purpose, the inner synchro ring 60 rests with the inner conical circumference surface 63 against a conical surface 84 of the selector gear 4.

Figure 9:
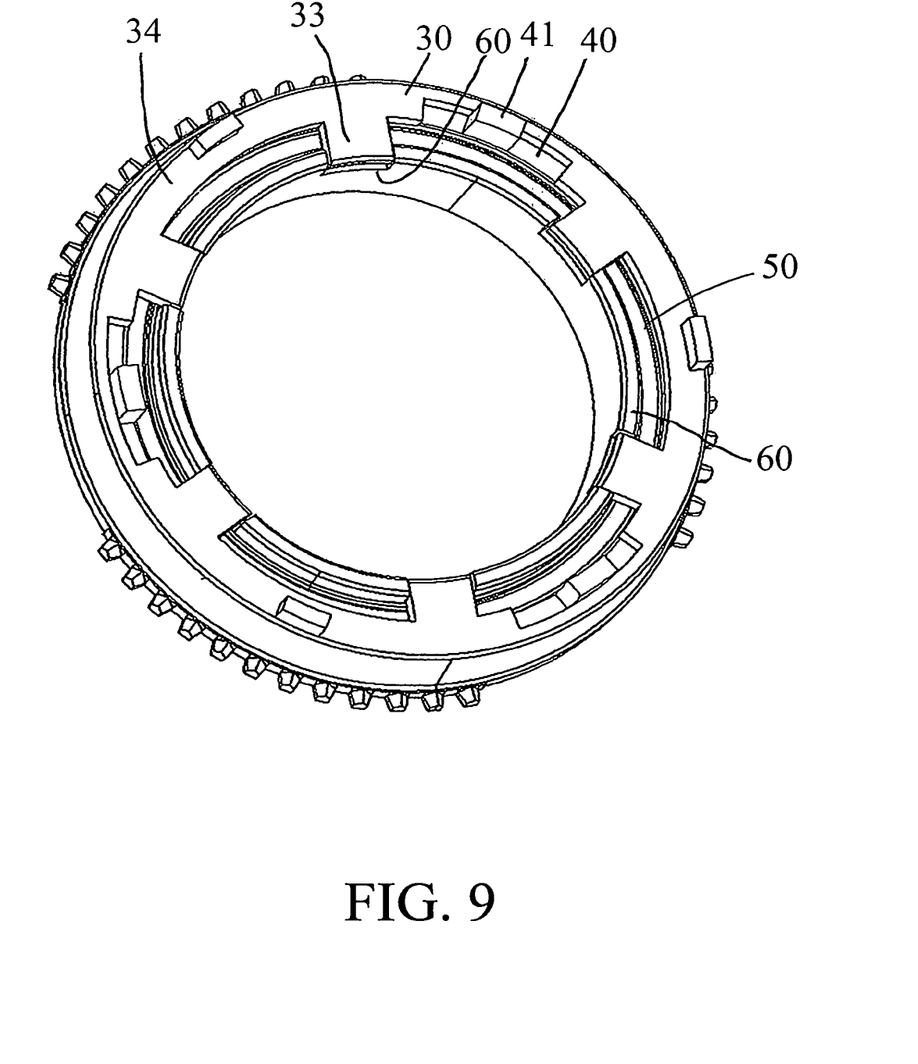
FIG. 9 shows the rings from FIGS. 5 through 8 in the assembled state.

FIG. 9 shows the rings 30, 40, 50, 60 shown in FIGS. 5 through 8 in the assembled state. It is clear that in the radial direction, viewed from the inside toward the outside, the inner synchro ring 60, the intermediate ring 50, the outer synchro ring 40, and the locking ring 30 are inserted into one another. FIG. 9 clearly shows how the drive tabs 33 of the locking ring 30 engage in the recesses 62 of the inner synchro ring 60. It is also readily apparent that the end surface 44, which is covered by the circumferential rim 34 of the locking ring 30, but is visible in the region of the recesses 35, rests against the circumferential end-surface rim 34. Each recess 35 accommodates a cam 41 of the outer synchro ring 40. Since the length of the recess 35 is greater in the circumference direction than the width of the cam 41, the cam 41 can be rotated relative to the locking ring 30. The length of the recess 35 here is dimensioned so that the cam 41 does not strike against the groove ends during the synchronization. The limited rotatability of the outer synchro ring 40 relative to the locking ring 30 is achieved by other components.

Figure 10:
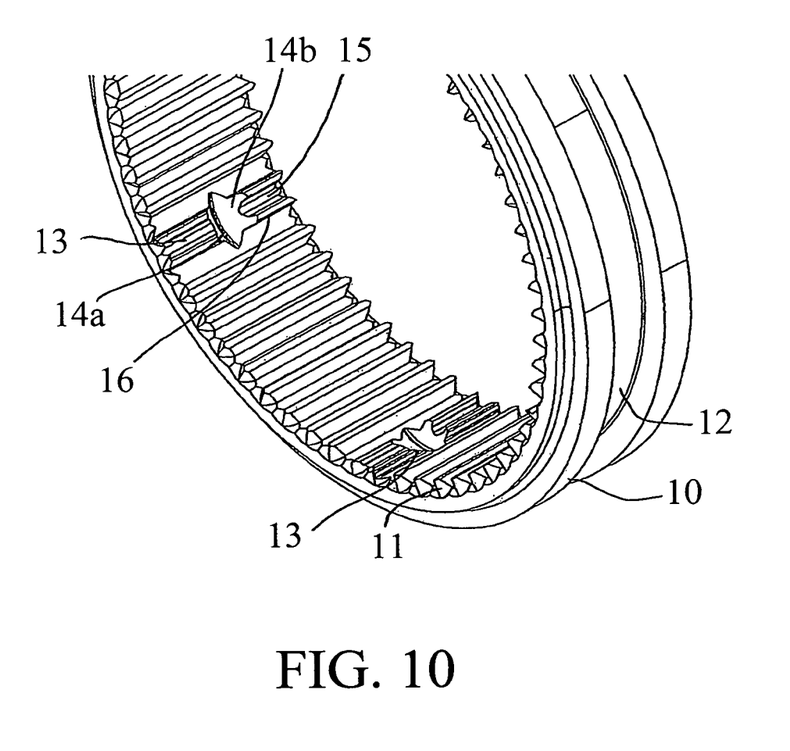
FIG. 10 shows a slider sleeve with an internal gearing and pre-synchronization grooves.

FIG. 10 shows the slider sleeve 10 with the circumferential groove 12 and the internal gearing 11. Three pre-synchronization grooves 13 for each shifting direction are provided in the internal gearing 11. The pre-synchronization groove 13 serves to accommodate the ball 72 of the pressure element 70 (see FIGS. 11a through 11c).

The pre-synchronization groove 13 has a steeper ramp 14a and a flatter ramp 14b. The flatter ramp 14b is oriented toward one of the shifting directions (indicated by the arrow 9) and produces a force on the ball 72, which has an axial component and a radial component. By the radial component, the ball 72 is pressed in opposition to the force of the spring, not shown, into the spring retainer 71 of the pressure element 70. By the axial component, the ball 72 and thus the pressure element 70 is driven in the shifting direction 9. A pressure component track 15 extends parallel to the teeth of the internal gearing 11 of the slider sleeve 10 and has an opening angle. The ball 72 of the pressure element 70 is guided in a centered fashion on the resulting ramps. The pressure component track 15 is interrupted by the pre-synchronization groove 13. By the opening angle of the pressure component track 15, a corresponding cutting edge is produced at the transition from the ramp of the pre-synchronization groove 13.

The pressure component track 15 is bounded by parallel raised regions 16. The raised regions 16 are axially interrupted in the middle of the component by the pre-synchronization groove 13. Depending on the distance of the parallel raised regions 16 from each other, they can be embodied by two adjacent teeth of the internal gearing 11 of the slider sleeve 10. This is the case in the exemplary embodiment shown in FIG. 10.

Figure 11:
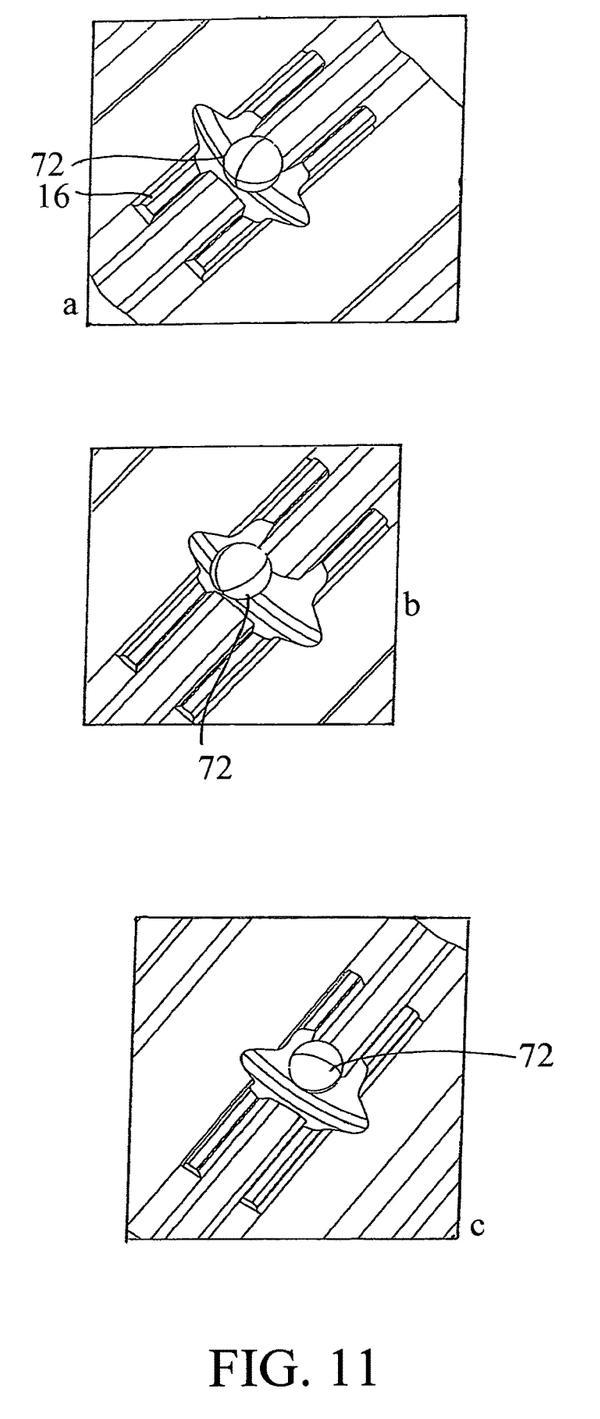
FIG. 11 shows various positions of the pressure component in the pre-synchronization groove and in a pressure component track.

In the exemplary embodiment in FIG. 11, by contrast, the raised regions 16 do not extend all the way to the end surfaces of the slider sleeve 10, instead ending spaced a certain distance apart from them. Consequently, sufficient space is left for the external gearing 82 of the coupling ring 81 when the coupling ring 81 and slider sleeve 10 engage with each other at the end of the shifting procedure.

FIG. 11a shows the ball 72 in a middle position inside the pre-synchronization groove. If the slider sleeve 10 is slid in the shifting direction 9, then an axial force acts on the ball 72, which presses the pressure element 70 against the outer synchro ring 40. This produces a frictional torque in the friction package, causing a rotation of the outer synchro ring 40, and thus of the pressure element 70 that is connected to it in a rotationally locked fashion, relative to the slider sleeve 10. Correspondingly, the ball 72 of the pressure element 70 moves in the circumference direction along the pre-synchronization groove (see FIG. 11b). A further deflection of the ball 72 along the pre-synchronization groove 13 is limited by the stop surfaces 25, which permit only a limited deflection of the pressure element 70 relative to the hub 20 and slider sleeve 10. When the locking ring 30 is unlocked, the pressure element 70 and thus the ball 72, because of the rotationally locked connection to the outer synchro ring 30, are moved back into the middle position again. At the same time, the slider sleeve 10 is moved farther toward the selector gear 4. In the process, the ball 72 is inserted between the raised regions on the pressure component track (see FIG. 11c).

Since the inner synchro ring 60 and the locking ring 30 are connected to each other in a rotationally locked fashion, the unlocking torque, which is applied to the locking teeth of the locking ring 30, counteracts the frictional torque of the second friction pairing 6 and the third friction pairing 8. Since the outer synchro ring 40 and the locking ring 30 are not connected to each other in a rotationally locked fashion, practically no frictional torque builds up in the first friction pairings, which counteracts the unlocking of the locking ring 30. Because of the two friction pairings 6, 8, however, the frictional torque that is to be overcome in the unlocking of the locking ring 30 is comparatively high so that the tips of the individual teeth of the internal gearing of the slider sleeve 10 can be embodied as sharp. This yields low shifting forces, meaning that a manual transmission, which is installed for example in a passenger vehicle and is equipped with the synchronizer device according to this invention, can be easily and conveniently shifted even by hand.

The invention claimed is:

1. A synchronizer device (1) for a manual transmission, having a shaft (2) and a selector gear (4) mounted on the shaft, the synchronizer device (1) comprising:
   a hub (20) which can be connected to the shaft (2) in a rotationally locked fashion, a slider sleeve (10) which is supported on the hub (20) in a rotationally locked fashion, and can be slid in an axial direction, a locking element that is designed to limit the slidability of the slider sleeve (10) in a locked position, a friction package, having an outer synchro ring (40), an inner synchro ring (60), and an intermediate ring (50), positioned between the outer synchro ring (40) and the inner synchro ring (60), with the outer synchro ring (40) and inner synchro ring (60) rotatable relative to each other, a servo unit having a first servo surface (26) on a first component and having a second servo surface (76) on a second component resting against the first servo surface (26), and a torque between the first component and second component causing the first servo surface (26) to slide along relative to the second servo surface (76) which produces an axially acting servo force on the friction package, the servo force introduced into the friction package by the outer synchro ring (40) and the outer synchro ring (40) able to rotate relative to the locking element, the locking element being a locking ring (30) with locking teeth (31) which in the locked position of the locking ring engage with the teeth of an internal gearing (11) of the slider sleeve (10), and the inner synchro ring (60) being connected to the locking ring (30) in a rotationally locked fashion.

2. The synchronizer device (1) according to claim 1, wherein the inner synchro ring (60) has a friction surface oriented radially inward in order to cooperate with a conical surface (84) of the selector gear (4).

3. The synchronizer device (1) according to claim 1, wherein a pressure element (70) is provided which is positioned in a groove (22) of the hub (20) and transmits an axial force of the slider sleeve (10) to the friction package.

4. A synchronizer device (1) for a manual transmission, having a shaft (2) and a selector gear (4) mounted on the shaft, the synchronizer device (1) comprising:
a hub (20) which can be connected to the shaft (2) in a rotationally locked fashion, a slider sleeve (10) which is supported on the hub (20) in a rotationally locked fashion, and can be slid in an axial direction, a locking element that is designed to limit the slidability of the slider sleeve (10) in a locked position, a friction package, having an outer synchro ring (40), an inner synchro ring (60), and an intermediate ring (50), positioned between the outer synchro ring (40) and the inner synchro ring (60), with the outer synchro ring (40) and inner synchro ring (60) rotatable relative to each other, a servo unit having a first servo surface (26) on a first component and having a second servo surface (76) on a second component resting against the first servo surface (26), and a torque between the first component and second component causing the first servo surface (26) to slide along relative to the second servo surface (76) which produces an axially acting servo force on the friction package, and the servo force introduced into the friction package by the outer synchro ring (40) and the outer synchro ring (40) able to rotate relative to the locking element, the locking element being a locking ring (30) with locking teeth (31) which in the locked position of the locking ring engage with the teeth of an internal gearing (11) of the slider sleeve (10), and the locking ring (30) having an axial contact surface for the outer synchro ring (40).

5. The synchronizer device (1) according to claim 4, wherein the inner synchro ring (60) is connected to the locking ring (30) in a rotationally locked fashion.

6. The synchronizer device (1) according to claim 5, wherein the locking ring (30) has a drive tab (33) oriented radially inward, which engages in a recess (62) of the inner synchro ring (60) in order to produce a form-fitting connection in the circumference direction.

7. The synchronizer device (1) according to claim 6, wherein the inner synchro ring (60) has a friction surface oriented radially inward in order to cooperate with a conical surface (84) of the selector gear (4).

8. The synchronizer device (1) according to claim 7, wherein a pressure element (70) is provided which is positioned in a groove (22) of the hub (20) and transmits an axial force of the slider sleeve (10) to the friction package.

9. The synchronizer device (1) according to claim 8, wherein the pressure element (70) has a cavity (77) in which a cam (41) of the outer synchro ring (40) engages so that the pressure element (70) and the outer synchro ring (40) are connected to each other in a rotationally locked fashion.

10. The synchronizer device (1) according to claim 8, wherein with a bottom (78) of a cavity (77), the pressure element (70) presses in the axial direction against a cam (41) of the outer synchro ring (40).

11. The synchronizer device (1) according to claim 8, wherein the pressure element (70), the second servo surface (76), and the hub embrace the first servo surface (26).

12. The synchronizer device (1) according to claim 8, wherein the hub (20) has two stop surfaces (25) for the pressure element (70), which extend essentially perpendicular to the circumference direction and limit a rotatability of the pressure element (70) relative to the hub (20).

13. The synchronizer device (1) according to claim 8, wherein the pressure element (70) has a pressure component of a spring-loaded ball (72) and the pressure component is pushed radially outward against the slider sleeve (10).

14. The synchronizer device (1) according to claim 9, wherein with a bottom (78) of the cavity (77), the pressure element (70) presses in the axial direction against the cam (41) of the outer synchro ring (40).

15. The synchronizer device (1) according to claim 14, wherein the pressure element (70), the second servo surface (76), and the hub embrace the first servo surface (26).

16. The synchronizer device (1) according to claim 15, wherein the hub (20) has two stop surfaces (25) for the pressure element (70), which extend essentially perpendicular to the circumference direction and limit a rotatability of the pressure element (70) relative to the hub (20).

17. The synchronizer device (1) according to claim 16, wherein the pressure element (70) has a pressure component of a spring-loaded ball (72) and the pressure component is pushed radially outward against the slider sleeve (10).

18. The synchronizer device (1) according to claim 17, wherein in the slider sleeve (10), a pre-synchronization groove (13) is provided, in which the pressure component can move in the circumference direction relative to the hub (20).

19. The synchronizer device (1) according to claim 18, wherein starting from a middle position of the pressure component, a maximum deflection along the pre-synchronization groove (13) corresponds approximately to a distance that the locking ring (30) travels in the circumference direction when it exits the locked position and thus permits the slider sleeve (10) to slide through in the axial direction.

20. The synchronizer device (1) according to claim 18, wherein transverse to the pre-synchronization groove (13), a pressure component track (15) is provided into which the pressure component is inserted after the locking element has exited the locked position.

21. The synchronizer device (1) according to claim 20, wherein starting from a middle position of the pressure component, a maximum deflection along the pre-synchronization groove (13) corresponds approximately to a distance that the locking ring (30) travels in the circumference direction when it exits the locked position and thus permits the slider sleeve (10) to slide through in the axial direction.

22. The synchronizer device (1) according to claim 21, wherein the locking ring (30) has an axial contact surface for the outer synchro ring (40).

* * * * *